US006961445B1

(12) United States Patent
Jensen et al.

(10) Patent No.: US 6,961,445 B1
(45) Date of Patent: Nov. 1, 2005

(54) IMAGE PROCESSING WARNING SYSTEM

(75) Inventors: David W. Jensen, Cedar Rapids, IA (US); David A. Haverkamp, Springville, IA (US); James E. Bodmer, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 644 days.

(21) Appl. No.: 09/849,750

(22) Filed: May 4, 2001

(51) Int. Cl.[7] .............................................. G06K 9/00
(52) U.S. Cl. ...................... 382/103; 701/9; 348/208.15
(58) Field of Search ............................... 382/104, 103, 382/218, 153, 189–190, 209; 180/169; 340/426.19, 340/435, 988, 426.26; 342/29, 70; 348/149, 348/155, 208.15; 356/28, 613; 434/69; 701/301, 701/45, 9; 700/79, 80

(56) References Cited

U.S. PATENT DOCUMENTS

| | | | | |
|---|---|---|---|---|
| 4,578,665 | A * | 3/1986 | Yang | 246/166.1 |
| 4,630,109 | A * | 12/1986 | Barton | 348/119 |
| 4,712,635 | A * | 12/1987 | Sumiya et al. | 180/197 |
| 4,878,050 | A * | 10/1989 | Kelley | 340/825.69 |
| 5,008,946 | A * | 4/1991 | Ando | 382/104 |
| 5,173,691 | A * | 12/1992 | Sumner | 340/905 |
| 5,245,422 | A * | 9/1993 | Borcherts et al. | 348/119 |
| 5,313,201 | A * | 5/1994 | Ryan | 340/961 |
| 5,366,376 | A * | 11/1994 | Copperman et al. | 434/69 |
| 5,485,892 | A * | 1/1996 | Fujita | 180/167 |
| 5,530,421 | A * | 6/1996 | Marshall et al. | 340/436 |
| 5,765,116 | A * | 6/1998 | Wilson-Jones et al. | 701/41 |
| 5,983,161 | A * | 11/1999 | Lemelson et al. | 701/301 |
| 6,014,608 | A * | 1/2000 | Seo | 701/201 |
| 6,259,379 | B1 * | 7/2001 | Paterson et al. | 340/970 |
| 6,302,545 | B1 * | 10/2001 | Schofield et al. | 359/601 |
| 6,314,364 | B1 * | 11/2001 | Nakamura | 701/200 |
| 6,411,328 | B1 * | 6/2002 | Franke et al. | 348/149 |
| 6,424,370 | B1 * | 7/2002 | Courtney | 348/143 |
| 6,529,132 | B2 * | 3/2003 | Boucourt | 340/583 |
| 6,565,046 | B2 * | 5/2003 | Uebel | 246/120 |
| 6,570,608 | B1 * | 5/2003 | Tserng | 348/143 |
| 6,583,733 | B2 * | 6/2003 | Ishihara et al. | 340/946 |
| 6,731,805 | B2 * | 5/2004 | Brodsky et al. | 382/199 |
| 6,757,006 | B1 * | 6/2004 | Yabe | 348/86 |

OTHER PUBLICATIONS

Risack et al., "A video-based Lane Keeping Assistant", IEEE Intelligent Vehicles Symposium, Oct. 3-5, 2000, pp. 356-361.*

Gavrilla et al., "A multi-sensor approach for the protection of vulnerable traffic participants", IEEE Instrumentation & Measurement Technology Conference, Budapest, Hungary, May 21, 2001, pp. 2044-2048. □ □.*

Altan et al., "Computer Architecture and Implementation of Vision-based Real-Time Lane Sensing", 1992 Intelligent Vehicles Symposium, Jun. 29, 1992, pp. 202-206.*

* cited by examiner

*Primary Examiner*—Yon J. Couso
(74) *Attorney, Agent, or Firm*—Nathan O. Jensen; Kyle Eppele

(57) ABSTRACT

A method and apparatus for capturing and processing images from a portion of a system in order to detect a warning condition for providing warnings to users or operators of the system. One or more image capture devices capable of capturing an image, for example, a continuous video, monitor at least a portion of the system. An image processing assembly processes the image captured by the image capture devices in real time for determining if the warning condition exists. Upon determining that the warning condition exists the image processing assembly causes a warning device to provide a warning to the user. The captured image may then be displayed to the user or operator if desired.

10 Claims, 7 Drawing Sheets

IMAGE PROCESSING WARNING SYSTEM

BACKGROUND OF THE INVENTION

The present invention relates generally to alerting and warning systems, and more specifically to a method and apparatus for capturing and processing images from a portion of a system for monitoring that portion of the system for conditions warranting an operator warning.

Alerting and warning apparatus are used in a variety of applications to provide warnings to user or operators of a system, for example, a vehicle, an aircraft, a ship, a railroad, a building, or the like of impending operator concerns such as impending mechanical failures, safety issues, and the like. For instance, typical aircraft systems may provide a variety of alerts, cautions and warnings for such operator concerns as engine fire, impending collision, stalling, or low hydraulic pressure. Similarly, automobile systems may provide warnings for open doors, engine overheating, poor traction, or low fuel. However, the operator of such system cannot view the affected portion of the system to determine if the warning is in fact true, or to determine whether the condition causing the warning warrants the operator's immediate attention and action. Further, most existing alerting and warning systems typically do not include internal redundancy that is capable of reliably indicating whether the warning provided to the operator is in fact a true warning condition or is instead a failure of the warning system itself.

SUMMARY OF THE INVENTION

Accordingly, the present invention is directed to a method and apparatus for capturing and processing images from a portion of a system in order to detect a warning condition so that a warning may be provided to users or operators of the system.

In accordance with one aspect of the invention, an apparatus for providing warnings to a user of a system upon detection of a warning condition within the system is disclosed. In an exemplary embodiment, the apparatus includes at least one image capture device for monitoring at least a portion of the system. The image capture device is capable of capturing an image, for example, a continuous video, of the portion of the system being monitored. An image processing assembly processes the image captured by the image capture device in real time for determining if the warning condition exists. Upon determining that the warning condition exists, the image processing assembly causes a warning device to provide a warning to the user. The captured image (video) may then be displayed to the user or operator if desired.

In accordance with a further aspect of the invention, a method for providing warnings to a user of a system upon detection of a warning condition is disclosed. In an exemplary embodiment, the method is comprised of the steps of capturing an image of at least a portion of a system; processing the captured image in real time for determining if the warning condition exists; and, if the warning condition is determined to exist, providing a warning to the user. In embodiments of the invention, processing of the captured image comprises correlating the captured image with a reference wherein the difference between the captured image and the reference is used to determine if a warning condition exists.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
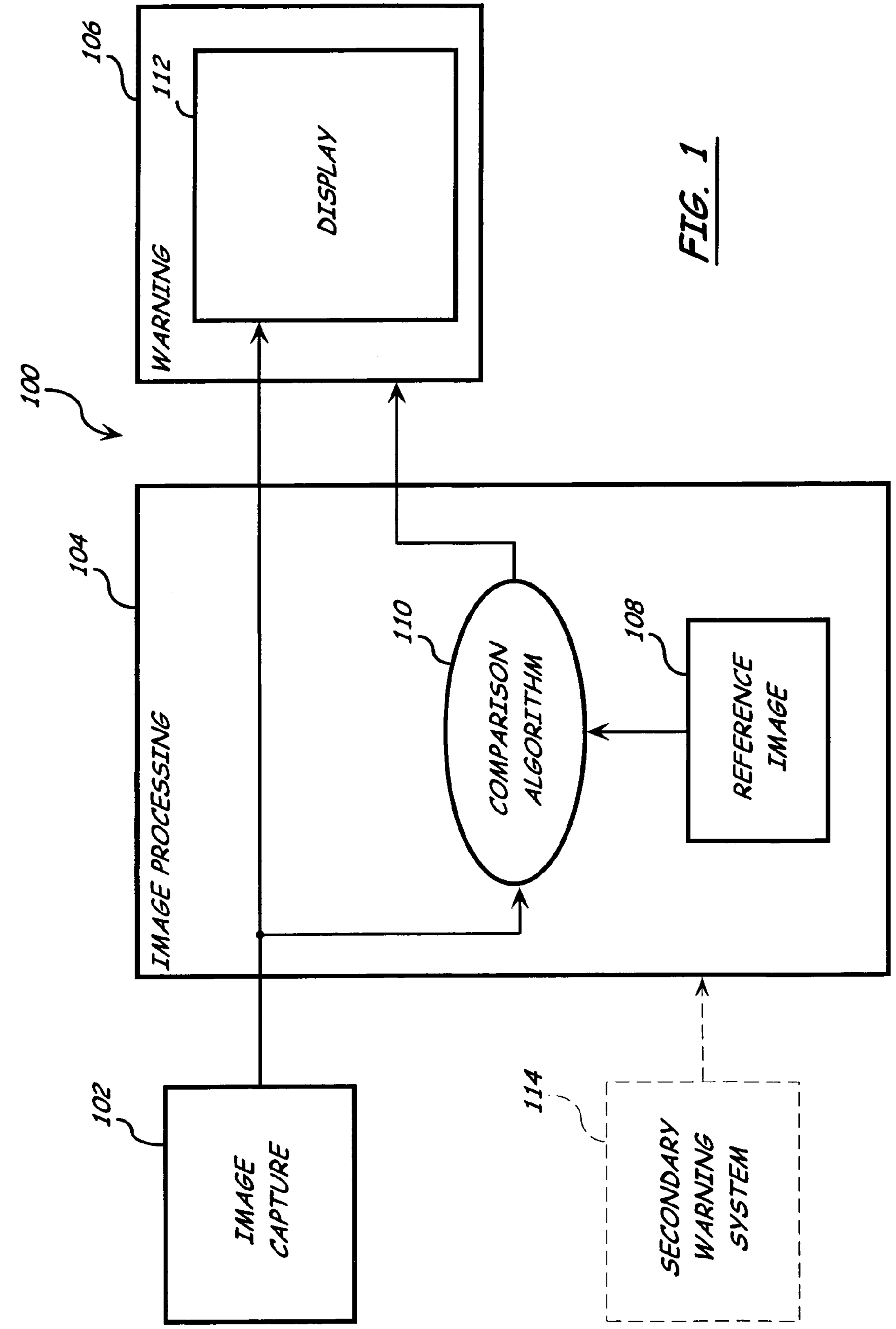
FIG. 1 is a block diagram generally illustrating an image processing warning system in accordance with an exemplary embodiment of the present invention.

Referring now to FIG. 1, an exemplary image processing warning system in accordance with the present invention is described. Typically, the image processing warning system 100 will function as an integrated sub-system of a master system [hereinafter system] such as a vehicle, an aircraft, a ship, a subway or railroad train, a railroad system, a building, or the like. The image processing warning system 100 is comprised of apparatus utilizing image capture and processing for providing warnings to a users or operators of the system upon detection of a condition warranting a warning [hereinafter a "warning condition"] within at least a portion of that system.

As shown in FIG. 1, the image processing warning system 100 includes one or more image capture devices 102 for monitoring at least a portion of the system. In exemplary embodiments of the invention, the image capture device may be comprised of a video camera such as an analog video camera, a digital video camera, digital camera, or the like. Preferably, the image capture device 102 is capable of capturing an image of the portion of the system being monitored. This captured image may be comprised of a still image, a continuous video, periodically sampled frames of a continuous video, or the like. Further, the captured image may be comprised of an optical image, or alternately images produced using other wavelengths (e.g., infrared, ultraviolet, other non-visible wavelength electromagnetic radiation, and the like). Additionally, the captured image may be comprised a fusion of images captured by two or more image capture devices.

An image processing assembly 104 processes the image captured by the image capture device 102 in real time for determining if a warning condition exists within the portion of the system being monitored. In the exemplary embodiment shown, the captured image (e.g., a continuous video feed, or sampled frames of a such a video feed) may be correlated with a stored reference 108 of the portion of the system being monitored using a comparison algorithm 110. In one embodiment, this reference 108 may comprise an image of the portion of the system being monitored under normal conditions (i.e., where no warning condition exists). Alternately, the reference may comprise an image of the portion of the system being monitored where a warning is desired (i.e., where the warning condition does exist). In other embodiments of the invention, the reference may be comprised of one or more parameters that are expected to be found in the captured image under normal conditions. For example, under normal conditions the captured image (or portions thereof) may be expected to have a particular parameter or attribute such as a certain color or colors, shape, texture, temperature (in an infrared image), or the like.

The comparison algorithm 110 correlates the captured image with the stored reference 108 to determine if the captured image deviates from the reference 108. When the deviation of the captured image from the reference reaches a predetermined threshold, a warning condition is determined to exist. Upon determining that a warning condition exists, the image processing assembly 104 causes a warning device 106 to provide a warning to the user. The captured image (e.g., real time continuous video) may further be displayed to the user or operator by the warning device 108 via a display device 110 if so desired by the user or operator of the system.

In exemplary embodiments, the system being monitored by the image processing warning system 100 of the present invention may also include one or more secondary warning systems 114 suitable for monitoring the portion of the system in order to provide warnings to the operator of the system. The image processing warning system 100 of the present invention functions to supplement or enhance such secondary warning systems 114 to provide redundant warnings of system failure or to provide the operator with desired additional information (for example, real time visual inspection of the portion of the system being monitored via a live video feed) should such a secondary warning system initiate a warning. Additionally, the image processing warning system 100 of the present invention may monitor other physical parameters provided by such secondary warning systems 114 for aiding processing of the captured image to determine if a warning condition exists. For example, such parameters may be fused with the captured images and compared to a stored reference providing normal values for the parameters.

Figure 2:
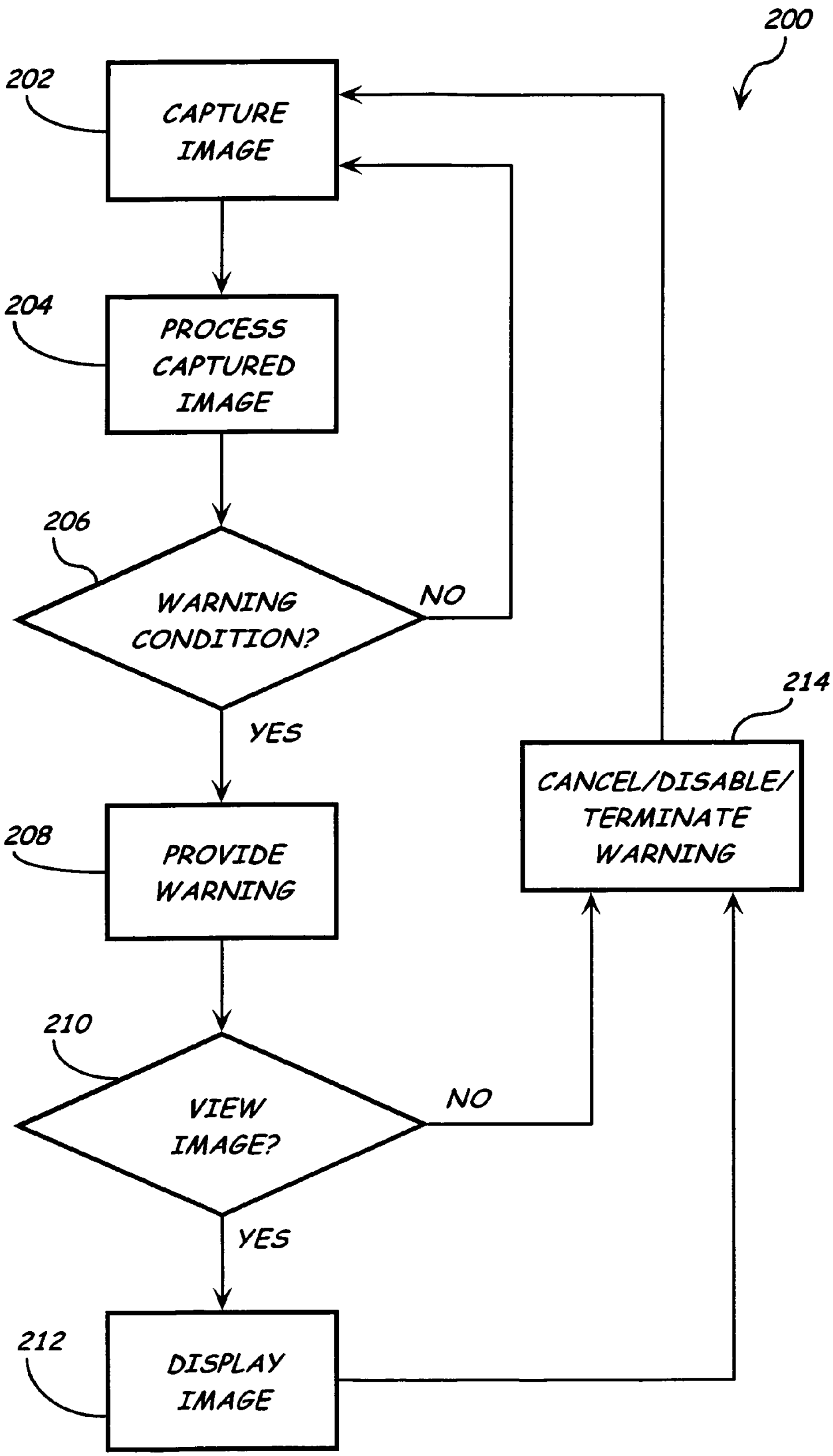
FIG. 2 is a flow diagram illustrating a method for providing warnings to a user of a system upon detection of a warning condition in accordance with an exemplary embodiment of the present invention.

Turning now to FIG. 2, a method for providing warnings to a user of a system upon detection of a warning condition is described. In an exemplary embodiment, the method 200 employs apparatus such as the apparatus described in the discussion of FIG. 1 to continuously monitor at least a portion of a system for a condition warranting a warning (a warning condition) to the users or operators of that system and then automatically initiates that warning if the warning condition is detected. As shown in FIG. 2, an image of the portion of the system being monitored is captured at step 202. In exemplary embodiments of the invention, capture of the image at step 202 may, for example, involve continuously monitoring the portion of the system utilizing a digital video camera to provide a continuous video that is provided to an image processing assembly. The captured image is then processed to determine if a warning condition exists at step 204. For example, in exemplary embodiments, the captured image (e.g., the continuous video feed or, alternately, periodically sampled frames of a continuous video feed) may be correlated or compared to a reference of the portion of the system using a comparison algorithm. A determination is next made as to whether a warning condition exists at step 206. In exemplary embodiments, wherein the captured image is compared to a reference, this determination may be made by ascertaining whether the captured image either matches the reference within a predetermined tolerance, or, alternately, deviates from the reference beyond a predetermined acceptable threshold. When a determination is made that no warning condition exists, monitoring of the portion of the system continues undisturbed and additional images of the portion of the system being monitored are captured and processed. However, when a warning condition is determined to exist, a warning is provided to the user or operator at step 208.

The user or operator may then be allowed to view the captured image. In exemplary embodiments, the user or operator may be queried to determine if he or she wishes to view the captured image of the portion of the system being monitored at step 210. For example, the warning may be provided by a multipurpose display (MPD) that may further display a prompt adjacent to the warning querying the user if the image is to be displayed (see FIGS. 3D and 3E). Alternately, the warning may be furnished by a warning light, warning horn, siren, or the like. If the operator chooses to view the image of the portion of the system in which a warning condition exists, the captured image is displayed at step 212. For example, when the warning is provided by a multipurpose display (MPD), the captured image may be displayed by the multipurpose display over or adjacent to the warning. Similarly, when another warning device, such as a warning light, siren or the like is employed, the image may be displayed by an associated display device.

If the user or operator chooses to not view the image (for example, if the user or operator is aware of the warning condition and has already taken steps to correct the warning condition such that viewing the captured image would only unnecessarily increase his or her workload), the warning may optionally be canceled at step 214 whereupon monitoring of the system may continue. If the warning condition is found to persist, the operator may further override or disable the warning, if such capability is deemed advantageous for the particular application. Similarly, upon viewing the captured image provided at step 212, the operator may determine that provision of the warning is no longer necessary. For example, the operator may have taken necessary remedial steps to correct the warning condition or there may be no corrective action possible. The operator may optionally cancel the warning at step 214, whereupon monitoring of the system may continue. Again, if the warning condition is found to persist, the operator may override or disable the warning, if such capability is deemed advantageous for the particular application. Finally, when the warning condition ceases to exist, the warning provided to the operator may also be automatically terminated at step 214 and monitoring of the system may continue.

It is anticipated that the image processing warning system of the present invention is suitable for use in a wide variety of systems including, but not limited to, aircraft and spacecraft, automobiles and like vehicles, ships and submarines, building systems, subway trains, railroad trains, railroad systems, patient monitoring systems utilized by health care providers, and security systems. Specific examples of systems employing the present invention are shown in FIGS. 3A through 7B. However, implementation of the image capture warning apparatus and method disclosed herein in other systems by those of skill in the art is anticipated and would not depart from the scope and spirit of the invention.

Figure 3A:
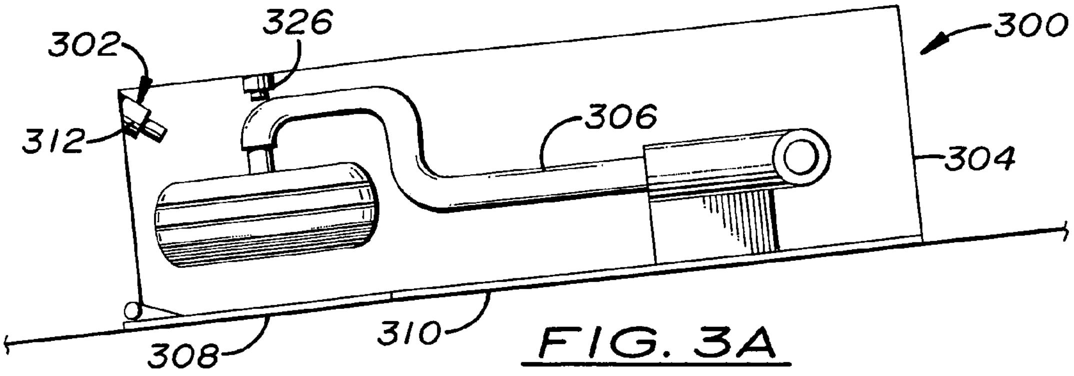
FIGS. 3A, 3B, and 3C are side elevational views of a landing gear employing an exemplary image processing warning system in accordance with the present invention for detecting and warning the flight crew of improper gear deployment.
Figure 3B:
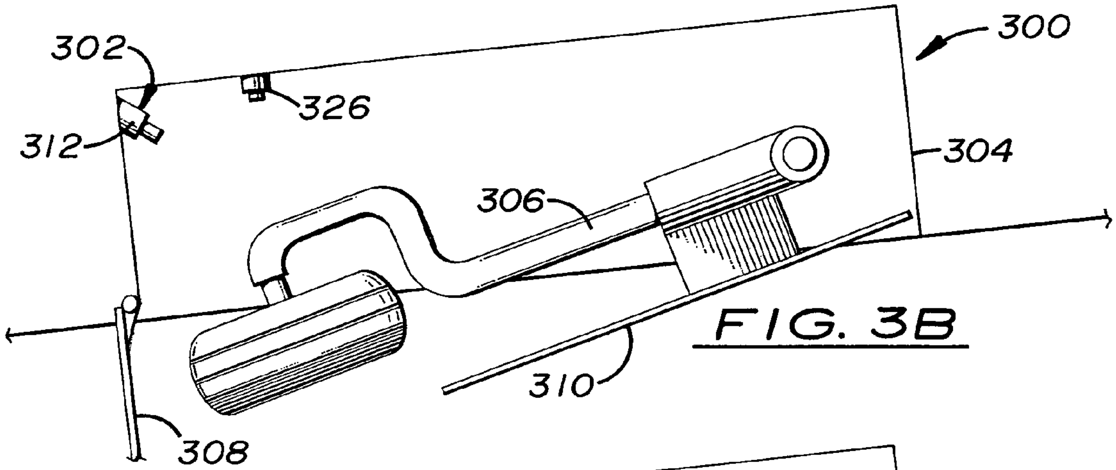

Referring now to FIGS. 3A through 3E, a system comprised of an aircraft 300 employing an exemplary image processing warning assembly or system 302 in accordance with the present invention for detecting and warning the flight crew of improper landing gear deployment and/or retraction is described. In FIGS. 3A through 3B, the aircraft 300 includes a landing gear bay 304 into which a landing gear 306 may be retracted during flight by an actuator or like retraction device (not shown). The landing gear bay 304 includes one or more doors 308 & 310 that enclose the landing gear 306 within the bay 304. An image capture device, such as digital video camera 312, of the image processing warning assembly 302 is positioned to monitor the landing gear bay 304 for proper extension and retraction of the landing gear 306. The video camera 312, or alternately, a second video camera, may also monitor the landing gear bay doors 306 for determining if they have properly opened and closed.

Figure 3C:
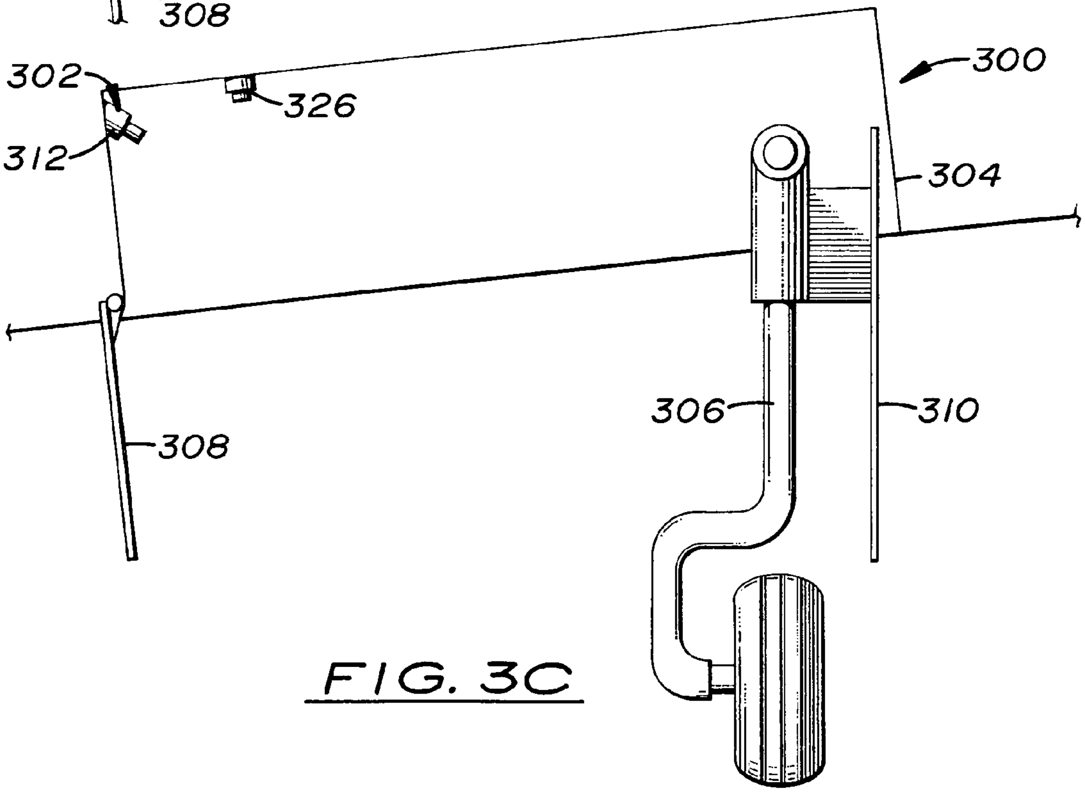
Figure 3D:
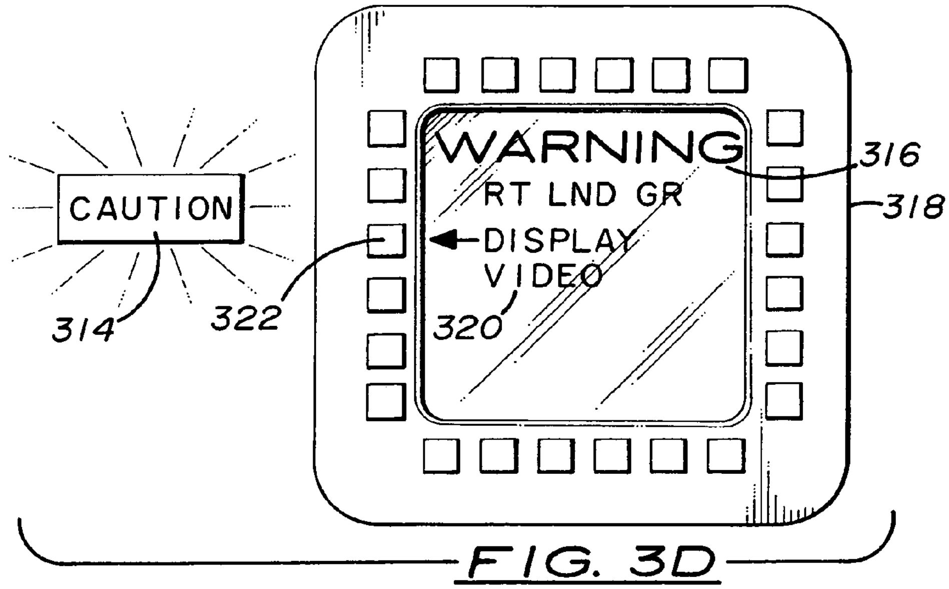
FIGS. 3D and 3E are illustrations of exemplary displays employed by an image processing warning system in accordance with the present invention.

In the exemplary embodiment shown, the video camera 312 captures a continuous video of the landing gear bay 304, landing gear 306, and landing gear bay doors 308 & 310. This video is processed by the image processing assembly (see FIG. 1) in real time for determining if a landing gear warning condition exists so that appropriate warnings may be provided to the flight crew of the aircraft 300. For instance, as previously discussed, the video captured by video camera 312 may be correlated or compared with static reference images of the landing gear bay 304, landing gear 306 and landing gear bay doors 308 & 310 using a comparison algorithm to determine if the captured images deviate from the references. When the deviation of the captured images from the references reaches a predetermined threshold, a warning condition is determined to exist. Upon determining that a warning condition exists, the image processing assembly causes a warning to be provided to the flight crew. For example, as shown in FIG. 3D, a landing gear caution light 314 may be illuminated and/or a warning (for example, "WARNING FRT LND GR") 316 may be displayed on a multipurpose display (MPD) 318 within the crew station of the aircraft 300.

In exemplary embodiments, the image processing warning assembly 302 is capable of detecting a variety of landing gear warning conditions for which advisory and cautionary warnings may be provided to the flight crew. For example, the image processing warning system 302 may be capable of detecting when the landing gear 306 is fully retracted as shown in FIG. 3A or fully extended as shown in FIG. 3C, and may provide an advisory warning of such events to the flight crew. Likewise, in exemplary embodiments, the image processing warning system 302 may be capable of detecting when the landing gear bay doors 308 & 310 are fully opened or closed, so as to provide an advisory warning of these events. Similarly, the image processing warning system 302 may be capable of detecting non-normal events such as a hung landing gear 306, as shown in FIG. 3B so that a warning, in this case a cautionary warning, may be provided to the flight crew.

Figure 3E:
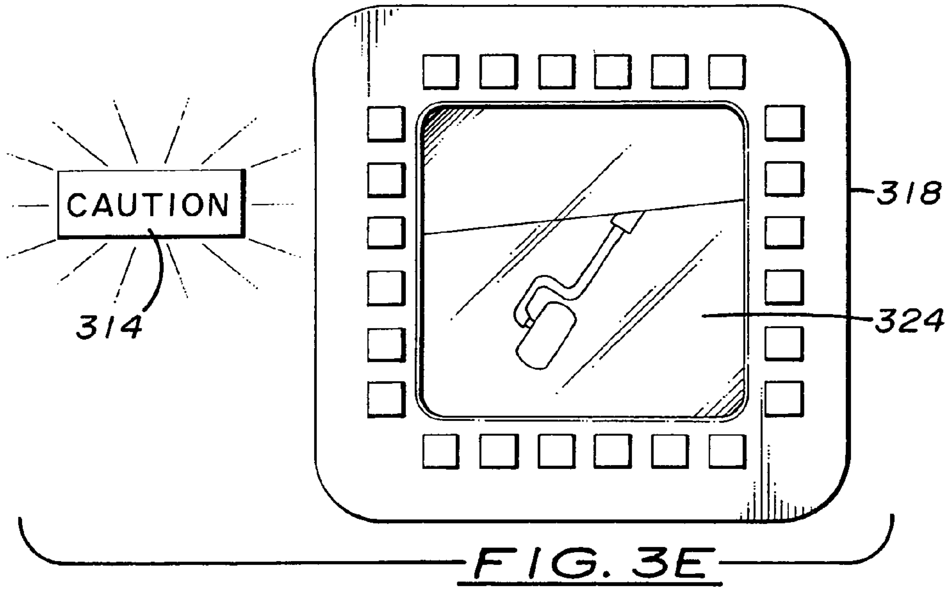

The image processing warning system may further allow the flight crew to access video of the landing gear bay 304. For example, in the exemplary embodiment shown in FIG. 3D, the multipurpose display (MPD) 318 may further provide a prompt ("Display Video") 320 adjacent to the warning ("WARNING FRT LND GR") 316 querying the user if video of the landing gear bay 304 is to be displayed. A member of the flight crew, for example the pilot, copilot, or the like, may select a button 322 of the multipurpose display (MPD) 318 associated with the prompt 320 causing the video 324 to be displayed (FIG. 3E).

In exemplary embodiments of the invention, the aircraft 300 may also include mechanical warning systems suitable for monitoring the landing gear and landing gear bay doors to provide a warning to the flight crew of improper landing gear or landing gear bay door position. For example, as shown in FIGS. 3A through 3C, the landing gear bay 304 may include a mechanical sensor such as proximity switch 326 positioned to sense proper landing gear retraction. Similarly, additional proximity switches or like mechanical sensors (not shown) may be positioned to sense proper landing gear extension, landing gear bay door closure, and the like. When one or more of the switches detects that the landing gear or a landing gear bay door is not in the desired position, the warning system provides a warning to the flight crew (for example, a landing gear position warning light 314 or a warning message on the multipurpose display (MPD) 318). The image processing warning system 302 may thus function to supplement or enhance such mechanical warning systems to provide redundant warnings of landing gear failure or to provide the flight crew with desired additional information (for example, real time visual inspection of the landing gear bay 304 via a live video feed) should such a mechanical system initiate a warning.

Figure 4:
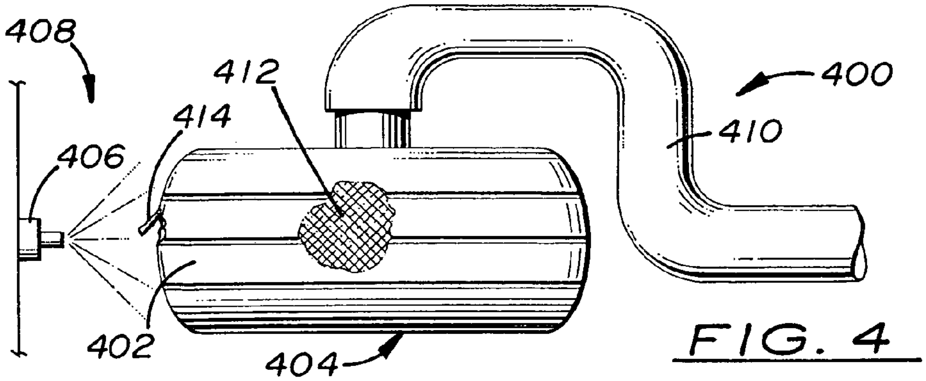
FIG. 4 is a side elevational view of a landing gear employing an exemplary image processing warning system in accordance with the present invention for detecting and warning the flight crew of excessive wear of or damage to the landing gear tire.

Referring now to FIG. 4, in an exemplary embodiment, the image processing warning system of the present invention may similarly be utilized by an aircraft 400 for detecting and warning the flight crew or maintenance personnel of abnormal tire conditions such as excessive wear or damage to the tread 402 of the landing gear tires 404. As shown in FIG. 4, an image capture device (for example, a digital video camera, digital camera, or the like) 406 is positioned within the landing gear bay 408 for monitoring the landing gear tire 404 upon its retraction within the bay 408. In accordance with the present invention, the image capture device captures an image of the landing gear tire's tread 402 that is processed by the image processing assembly of the image processing warning system (FIG. 1) for providing a warning if excessive wear in 412 or damage to 414 the tread 402 is found to exist. For example, in an exemplary embodiment, the captured image may be correlated with a reference of an unworn tire tread using a suitable comparison algorithm, whereupon excessive tread wear 412 or damage 414 to the tire 404 would cause a warning to be provided to the flight crew or other maintenance personnel within the crew station of the aircraft 400. In this manner, the image processing warning system may furnish a go/no go indication of tire tread safety. The image processing warning system may further allow the flight crew or maintenance personnel to access the tire tread image to provide in-crew station inspection of the tire 404, or may transmit the captured tire tread image to a central maintenance facility, group (an airline), or agency (such as the Federal Aviation Administration (FAA)) via a wireless radio frequency transmission or a wired ground network connection such as an Intranet or the Internet, or the like for inspection by maintenance personnel, airline or governmental inspectors, or the like.

Figure 5A:
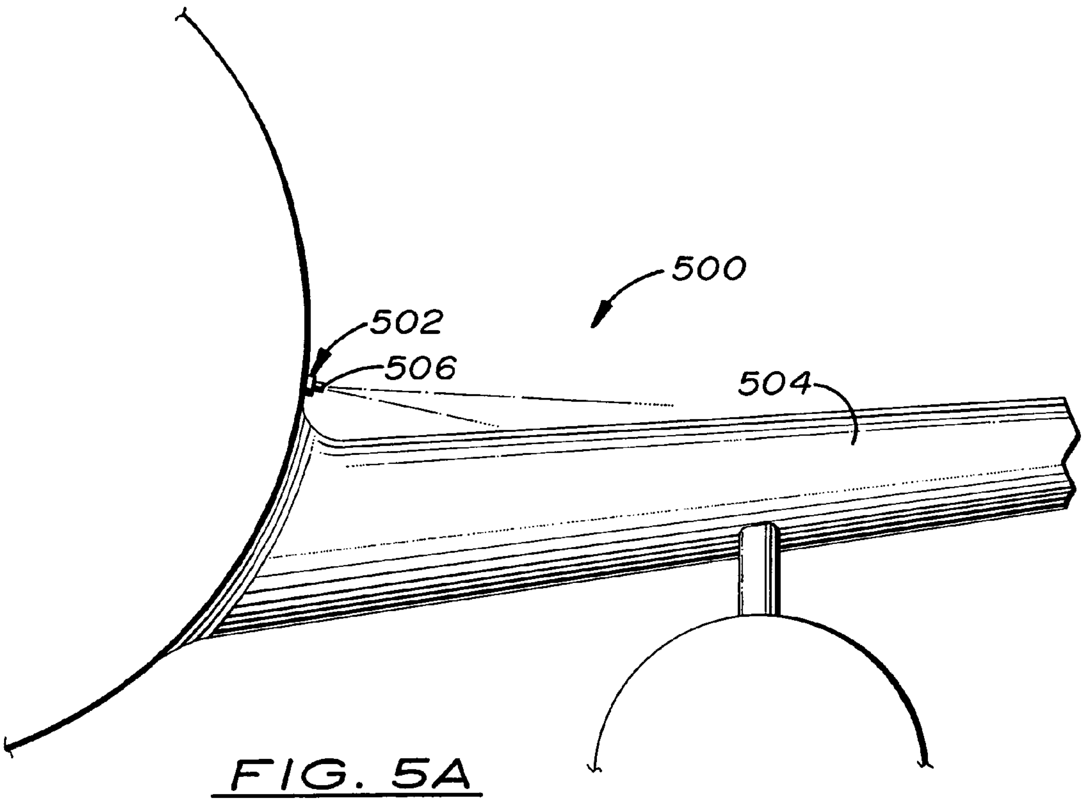
FIGS. 5A and 5B are elevational views of an aircraft wing employing an exemplary image processing warning system in accordance with the present invention for detecting and warning the flight crew of icing of the wing's surface.
Figure 5B:
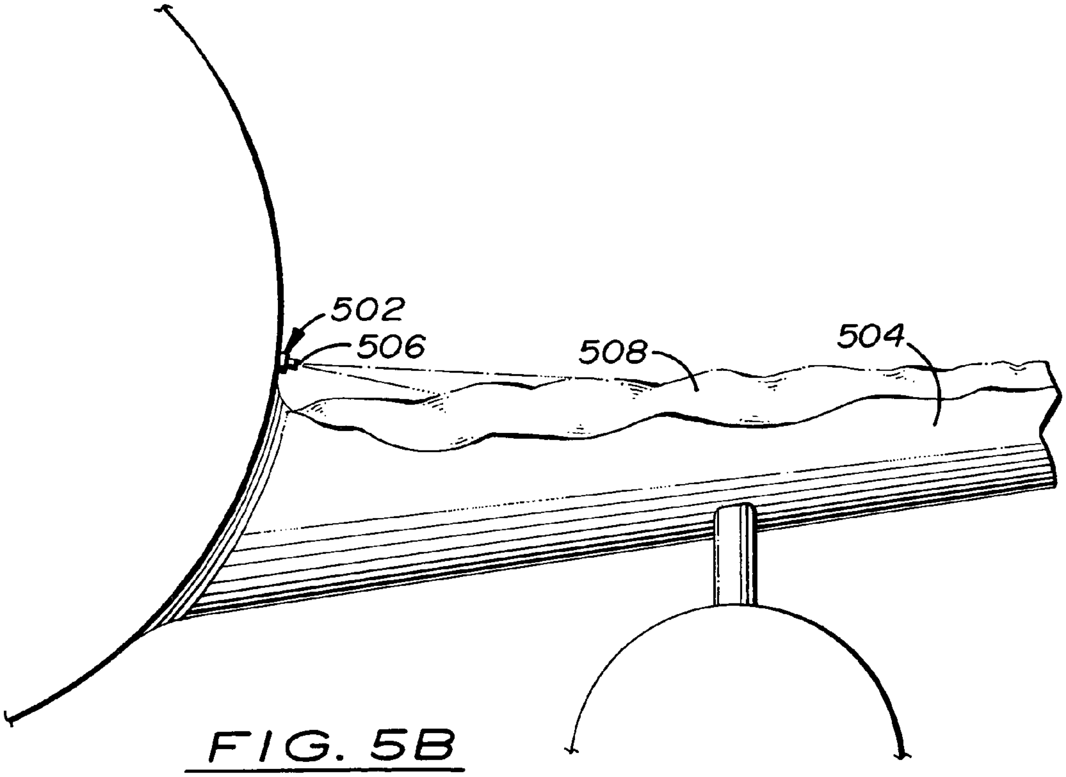

Referring now to FIGS. 5A and 5B, a system comprised of an aircraft 500 employing an exemplary image processing warning assembly 502 in accordance with the present invention for detecting and warning the flight crew of wing surface irregularities (for example, ice buildup on the aircraft's wing or other control surfaces 504) is described. As shown, an image capture device (for example, a digital video camera, digital camera, or the like) 506 of the image processing warning assembly (see FIG. 1) is positioned on the aircraft 500 for monitoring the leading edge surfaces of the wing 504. In exemplary embodiments, the image capture device 506 may be capable of detecting electromagnetic radiation within the infrared range for sensing temperature differences along the wing's surface. In this manner, the image capture device 506 may more accurately detect the buildup of ice 508 (which may be transparent or translucent) on the wing surface to provide an image of the wing surface showing any ice buildup. The image captured by the image capture device 506 is then processed by the image processing assembly of the image processing warning system (FIG. 1) to determine whether ice 508 has accumulated on the wing's surface beyond an acceptable amount. For instance, the captured image may be correlated with a reference of the wing's surface without ice buildup. The amount of ice buildup on the wing surface 504 may be measured from the difference between the correlated captured image and the reference. Where the amount of ice 508 on the wing surface exceeds a predetermined threshold level as shown in FIG. 6B, a warning condition is determined to exist, and a warning may be provided to the flight crew (for example, a wing icing warning light or a warning message on the multipurpose display (MPD) as shown in FIGS. 3D and 3E). The image processing warning system may further allow the flight crew to access the captured image to provide in-crew station inspection of the wing surfaces 504, or may transmit the captured image to a central facility such as the flight control tower or ground traffic control tower, or alternately a regulatory body via wireless radio frequency transmission, network connection, or the like, for inspection by air traffic control personnel, ground traffic control personnel, maintenance personnel, airline or regulatory agency inspectors, or the like.

Figure 6A:
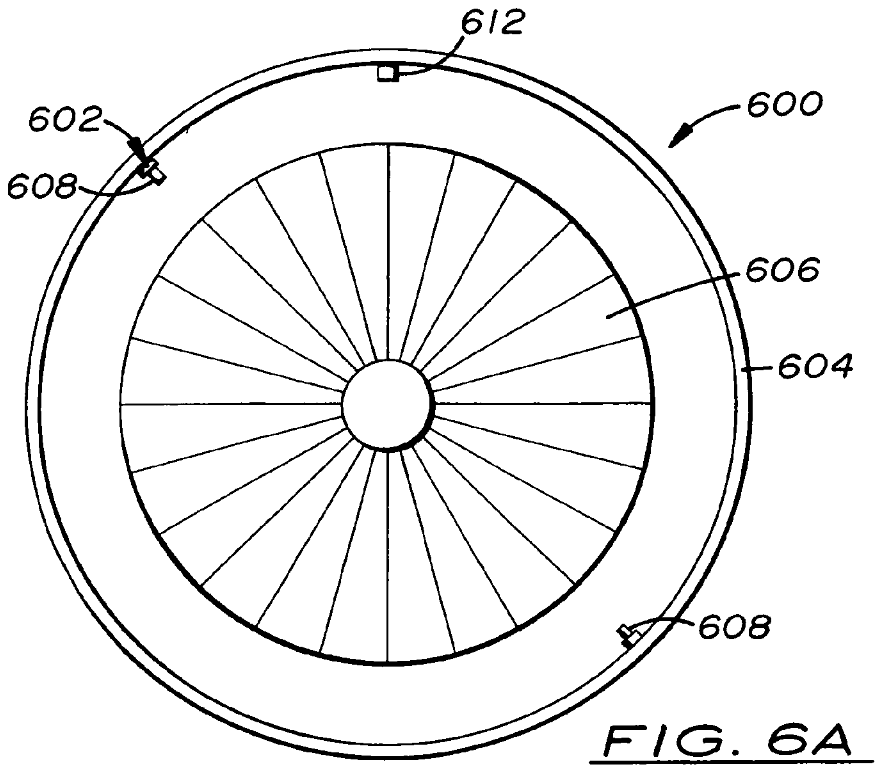
FIGS. 6A and 6B are end elevational views of an aircraft's engine compartment employing an exemplary image processing warning system in accordance with the present invention for detecting and warning the flight crew of icing, excessive smoke, or fire in the compartment.
Figure 6B:
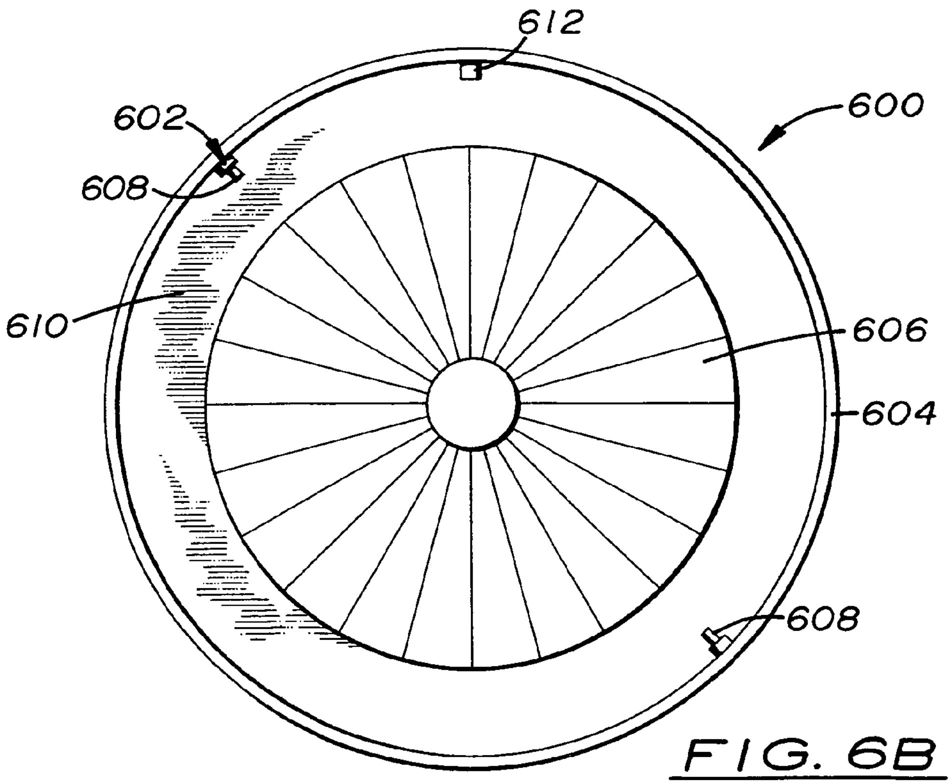

Referring now to FIGS. 6A and 6B, a system comprised of an aircraft 600 employing an exemplary image processing warning assembly 602 in accordance with the present invention for detecting and warning the flight crew of warning conditions such as, for example, smoke, fuel leaks, fire within the engine compartment 604 or excessive vibration of the engine 606 is described. As shown, one or more image capture devices (for example, digital video cameras, digital cameras, or the like) 608 of the image processing warning assembly (see FIG. 1) are positioned within the engine compartment 604 for monitoring the aircraft's engine 606. In exemplary embodiments, the image capture device 608 may be capable of sensing electromagnetic radiation within the infrared range for detecting differences in temperature within the engine compartment 604. The image captured by the image capture device 608 is then processed by the image processing assembly of the image processing warning system 602 (see also FIG. 1) for determining if there are any outward indications that the engine 606 may be malfunctioning such as smoke, fire, fuel leaks, hydraulic leaks, engine oil leaks, or the like 610. For instance, the captured image may be correlated with a reference of the engine compartment under normal conditions. The presence of warning conditions within the engine compartment may in this manner be detected from the difference between the correlated captured image and the reference. If a warning condition is determined to exist, a warning may be provided to the flight crew (for example, a engine warning light or a warning message on the multipurpose display (MPD) shown in FIGS. 3D and 3E). The image processing warning system may further allow the flight crew to access the captured image to provide in-crew station inspection of the engine compartment 604 and engine 606.

In exemplary embodiments of the invention, the aircraft 600 may also include secondary warning systems suitable for monitoring the engine compartment for a specific warning condition and providing a warning to the flight crew if this condition is detected. For example, as shown in FIGS. 6A and 6B, the engine compartment 604 may include one or more engine fire detectors 612 positioned to sense a fire within the engine bay 604. When one or more of the sensors 612 senses fire within the engine compartment, the warning system provides a warning to the flight crew (for example, a fire warning light or a warning message on the multipurpose display (MPD)) and may also activate an automatic fire suppression system. The image processing warning system 602 of the present invention may thus function to supplement or enhance such warning systems to provide a redundant warning of warning conditions within the engine compartment 604 and to provide the flight crew with needed additional information (real time visual inspection of the engine compartment 604 via a live video feed) should such a system cause a warning to be provided.

Figure 7A:
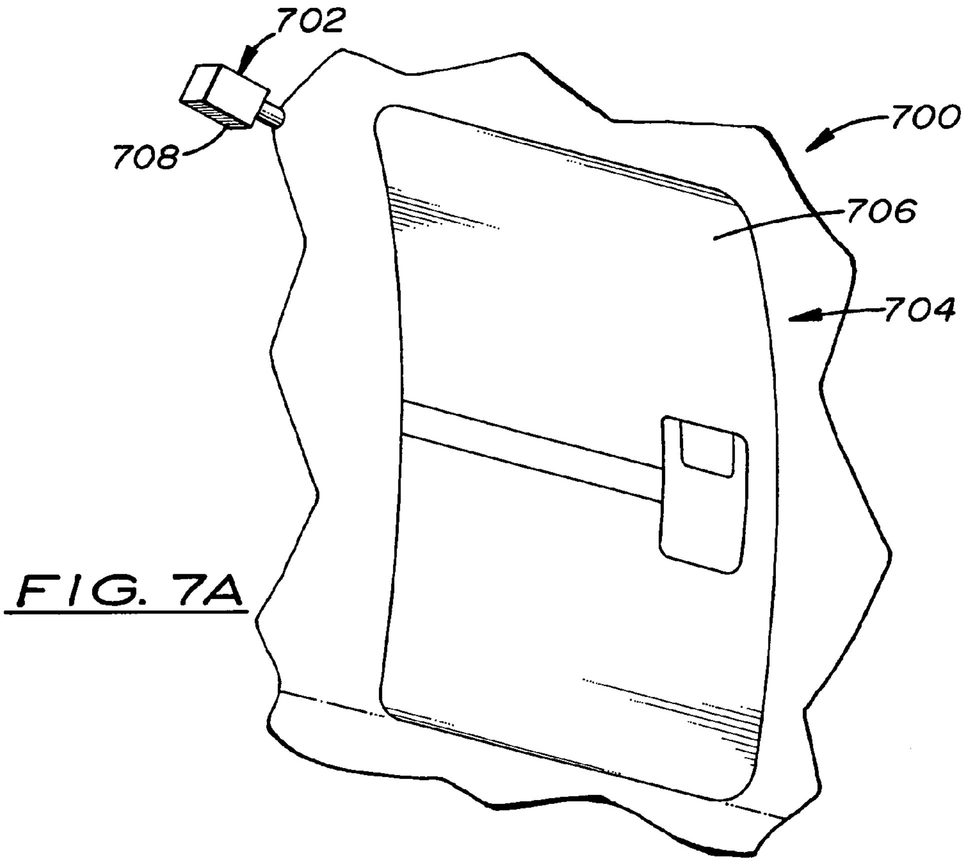
FIGS. 7A and 7B are isometric views of the entry hatch of an aircraft employing an exemplary image processing warning system in accordance with the present invention for detecting and warning the flight crew of an intruder.
Figure 7B:
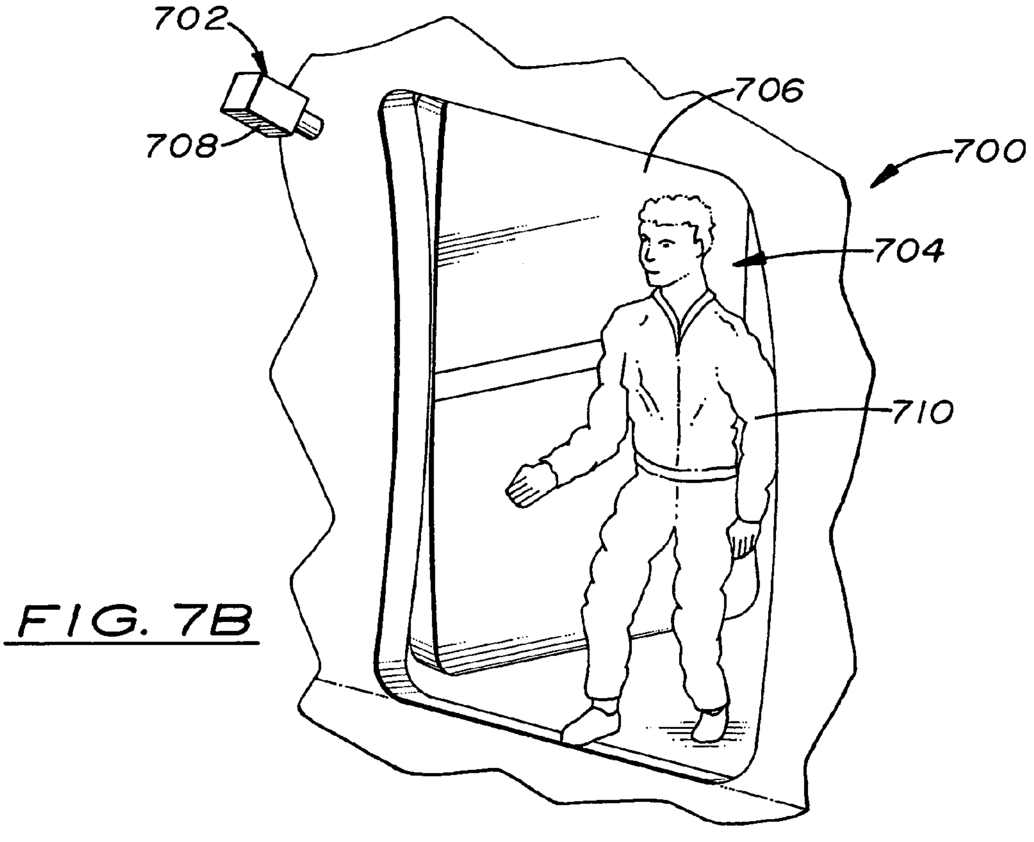

Referring now to FIGS. 7A and 7B, an image processing warning system in accordance with an exemplary embodiment of the present invention is shown wherein the system is used to provide monitoring of an area such as the entrance to an aircraft, the entrance to the crew station of the aircraft, the aircraft's flight deck, the entrance to a secured area in a building, a cabin of a subway train, a room in a museum, or the like for security purposes. For example, as shown in FIGS. 7A and 7B, an aircraft 700 may utilize the image processing warning system 702 of the present invention to monitor an area 704 within the aircraft such as the entrance 706 to the aircraft 700 or, alternately, the entrance to the crew station of the aircraft 700, the aircraft's flight deck, or the like. As shown, one or more image capture devices (for example, digital video cameras, digital cameras, or the like) 708 of the image processing warning assembly 702 are positioned within the area 704 for monitoring the entryway 706. The image captured by the image capture device 708 is then processed by the image processing assembly of the image processing warning system 702 (see also FIG. 1) for determining if a warning condition, for example, the presence of an intruder, exists within the area 704. For instance, the captured image may be correlated with a static reference of the area to determine if an intruder 710 has entered the area 704. When an intruder 710 is detected within the monitored area 704, as shown in FIG. 7B, a warning condition is determined to exist, and a warning may be provided to the flight crew or security personnel in a central facility via wireless radio frequency transmission, network connection, or the like. The image processing warning system may further allow the flight crew or security personnel to access the captured image to provide verification of the warning.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for providing warnings to a user of a system upon detection of a warning condition within the system, comprising:

at least one image capture device for monitoring at least a portion of the system, said image capture device being capable of capturing an image of the portion of the system being monitored;

a secondary warning system for detecting the warning condition;

an image processing assembly for processing the image captured by the image capture device and determining whether the secondary warning system detects the warning condition; and a warning device for providing a warning to the user;

wherein the image processing assembly processes the image captured by the image capture device in real time for determining if the warning condition exists and upon determining that the warning condition exists, verifies the existence of the warning condition from the secondary warning system and causes the warning device to provide a warning to the user.

2. The apparatus as claimed in claim 1, wherein said warning device comprises a display displaying the image captured by the image capture device to the user.

3. The apparatus as claimed in claim 1, wherein the image processing assembly includes a memory for storing a reference of the portion of the system being monitored by the image capture device.

4. The apparatus as claimed in claim 1, wherein said image processing assembly processes the image captured by the image processing device by comparing the captured image with the reference.

5. The apparatus as claimed in claim 1, wherein said at least one image capture device comprises a video camera and wherein said captured image is comprised at least one of, a continuous video and sampled frames of a continuous video.

6. The apparatus as claimed in claim 1, wherein the system comprises an aircraft, the portion of the system being monitored comprises a landing gear and the warning condition comprises improper deployment of the landing gear.

7. The apparatus as claimed in claim 1, wherein the system comprises an aircraft, the portion of the system being monitored comprises a landing gear and the warning condition comprises an abnormal tire condition.

8. The apparatus as claimed in claim 1, wherein the system comprises an aircraft, the portion of the system being monitored comprises a wing surface and the warning condition comprises surface irregularities.

9. The apparatus as claimed in claim 1, wherein the system comprises an aircraft, the portion of the system being monitored comprises an engine bay and the warning condition comprises engine compartment irregularities.

10. The apparatus as claimed in claim 1, wherein the system comprises an a secured area, the portion of the system being monitored comprises a region of the secured area, and the warning condition comprises an unauthorized presence in the region.

* * * * *